United States Patent

Oliver et al.

(10) Patent No.: US 7,451,487 B2
(45) Date of Patent: Nov. 11, 2008

(54) FRAUDULENT MESSAGE DETECTION

(75) Inventors: Jonathan Oliver, San Carlos, CA (US); Scott D. Eikenberry, Menlo Park, CA (US); Gleb Budman, Redwood City, CA (US); Bryan Kim, Mountain View, CA (US)

(73) Assignee: SonicWall, Inc., Sunnyvale, CA (US)

( * ) Notice: Subject to any disclaimer, the term of this patent is extended or adjusted under 35 U.S.C. 154(b) by 1129 days.

(21) Appl. No.: 10/678,965

(22) Filed: Oct. 2, 2003

(65) Prior Publication Data

US 2007/0101423 A1    May 3, 2007

Related U.S. Application Data

(60) Provisional application No. 60/501,481, filed on Sep. 8, 2003.

(51) Int. Cl.
G06F 21/00 (2006.01)
G06F 11/30 (2006.01)
G06F 15/16 (2006.01)

(52) U.S. Cl. .................................. 726/24; 709/206
(58) Field of Classification Search ............ None
See application file for complete search history.

(56) References Cited

U.S. PATENT DOCUMENTS

| | | | |
|---|---|---|---|
| 5,903,830 A | 5/1999 | Joao et al. | |
| 5,982,890 A | 11/1999 | Akatsu | |
| 5,987,440 A | 11/1999 | O'Neil et al. | |
| 6,092,194 A * | 7/2000 | Touboul | 726/24 |
| 6,112,227 A | 8/2000 | Heiner | |
| 6,122,740 A | 9/2000 | Andersen | |
| 6,154,844 A * | 11/2000 | Touboul et al. | 726/24 |
| 6,199,102 B1 | 3/2001 | Cobb | |
| 6,321,338 B1 | 11/2001 | Porras et al. | |
| 6,334,121 B1 | 12/2001 | Primeaux et al. | |
| 6,650,890 B1 | 11/2003 | Irlam et al. | |
| 6,757,830 B1 * | 6/2004 | Tarbotton et al. | 713/188 |
| 6,763,462 B1 * | 7/2004 | Marsh | 713/188 |
| 6,802,012 B1 * | 10/2004 | Smithson et al. | 726/24 |
| 6,804,780 B1 * | 10/2004 | Touboul | 713/181 |
| 6,851,057 B1 * | 2/2005 | Nachenberg | 726/24 |
| 6,938,167 B2 | 8/2005 | Roskind | |
| 6,941,348 B2 | 9/2005 | Petry et al. | |
| 7,096,500 B2 * | 8/2006 | Roberts et al. | 726/24 |
| 7,114,185 B2 * | 9/2006 | Moore et al. | 726/24 |
| 7,234,167 B2 * | 6/2007 | Teblyashkin et al. | 726/24 |
| 7,257,842 B2 * | 8/2007 | Barton et al. | 726/24 |

(Continued)

OTHER PUBLICATIONS

Dwork, Cynthia, et al. "Pricing via Processing or Combating Junk Mail," CRYPTO '92, Springer-Verlag LNCS 740, pp. 139-147, 1992.

(Continued)

*Primary Examiner*—Christopher A Revak
(74) *Attorney, Agent, or Firm*—Carr & Ferrell LLP

(57) ABSTRACT

A technique for classifying a message is disclosed. In some embodiments, the technique comprises extracting a plurality of reference points, classifying the plurality of reference points, and detecting that the message is a phish message based on the classified reference points. In some embodiments, the technique comprises identifying a plurality of fraud indicators in the message, applying a statistical analysis on the plurality of fraud indicators; and determining whether the message is a fraudulent message based on the analysis.

15 Claims, 3 Drawing Sheets

U.S. PATENT DOCUMENTS

| | | | |
|---|---|---|---|
| 7,293,063 B1* | 11/2007 | Sobel | 709/206 |
| 7,310,660 B1* | 12/2007 | White et al. | 709/206 |
| 2003/0088627 A1 | 5/2003 | Rothwell et al. | |
| 2003/0172166 A1 | 9/2003 | Judge et al. | |
| 2003/0233418 A1 | 12/2003 | Goldman | |
| 2004/0024639 A1 | 2/2004 | Goldman | |
| 2004/0088570 A1* | 5/2004 | Roberts et al. | 713/201 |
| 2004/0158554 A1 | 8/2004 | Trottman | |
| 2004/0267886 A1* | 12/2004 | Malik | 709/206 |
| 2005/0055410 A1 | 3/2005 | Landsman et al. | |
| 2005/0108562 A1* | 5/2005 | Khazan et al. | 713/200 |
| 2005/0169274 A1* | 8/2005 | Shuster | 370/392 |
| 2005/0257261 A1 | 11/2005 | Shraim et al. | |
| 2006/0068755 A1* | 3/2006 | Shraim et al. | 455/410 |
| 2006/0123464 A1* | 6/2006 | Goodman et al. | 726/2 |
| 2006/0123478 A1* | 6/2006 | Rehfuss et al. | 726/22 |
| 2006/0168031 A1* | 7/2006 | Cai et al. | 709/206 |
| 2006/0224677 A1* | 10/2006 | Ishikawa et al. | 709/206 |
| 2006/0251068 A1* | 11/2006 | Judge et al. | 370/389 |
| 2007/0033639 A1* | 2/2007 | Goodman et al. | 726/2 |
| 2007/0039038 A1* | 2/2007 | Goodman et al. | 726/2 |
| 2007/0107053 A1* | 5/2007 | Shraim et al. | 726/22 |
| 2007/0192853 A1* | 8/2007 | Shraim et al. | 726/22 |
| 2007/0294352 A1* | 12/2007 | Shraim et al. | 709/206 |
| 2007/0294762 A1* | 12/2007 | Shraim et al. | 726/22 |
| 2007/0299777 A1* | 12/2007 | Shraim et al. | 705/51 |
| 2007/0299915 A1* | 12/2007 | Shraim et al. | 709/206 |

OTHER PUBLICATIONS

Skoll, David F., "How to Make Sure a Human is Sending You Mail," Google Groups Thread (Nov. 17, 1996).

Byrne, Julian, "My Spamblock," Google Groups Thread (Jan. 19, 1997).

Guilmette, Ronald F., "To Mung or Not to Mung," Google Groups Thread (Jul. 24, 1997).

"Majordomo FAQ," Oct. 20, 2001.

Gabrilovich et al., "The Homograph Attack", Communications of the ACM, 45(2):128, Feb. 2002.

Langberg, Mike, "Spam Foe Needs Filter of Himself," (Email Thread Dated Apr. 5, 2003).

McCullagh, Declan, "In-Boxes that Fight Back," News.com, May 19, 2003.

Templeton, Brad, "Viking-12 Junk E-Mail Blocker," (believed to have last been updated Jul. 15, 2003).

"FBI Says Web 'Spoofing' Scams are a Growing Problem," Federal Bureau of Investigation Press Release, Jul. 21, 2003.

McWilliams, Brian, "Cloaking Device Made for Spammers," Wired News, Oct. 9, 2003.

Merwe et al., "Characteristics and Responsibilities Involved in a Phishing Attack," 2005.

Kirda et al., "Protecting Users Against Phishing Attacks with AntiPhish," IEEE Proc. of the 29th Ann. Int'l Comp. Software and App. Conference, 2005.

* cited by examiner

FRAUDULENT MESSAGE DETECTION

CROSS REFERENCE TO RELATED APPLICATIONS

This application claims priority to U.S. Provisional Patent Application No. 60/501,481 entitled FRAUDULENT MESSAGE DETECTION filed Sep. 8, 2003, which is incorporated herein by reference for all purposes.

FIELD OF THE INVENTION

The present invention relates generally to electronic messages. More specifically, classifying messages is disclosed.

BACKGROUND OF THE INVENTION

There has been an increasing number of Internet scams designed to trick people into revealing personal information such as credit card numbers, passwords, social security numbers, etc. to unscrupulous individuals who intend to use the information for fraudulent purposes. These scams, also known as "phishing", usually involve sending electronic messages such as e-mail to unsuspecting users. These messages are designed to appear as though they come from a reputable source, for example e-commerce companies, banks, credit card companies or other well-known people or institutions. The messages are often disguised as security alerts, account maintenance or renewal notices. The messages typically instruct the recipients to enter their personal information in the message, or direct the recipients to a website operated by the fraud message sender where the information may be entered.

Since the messages typically appear to have a legitimate purpose, they often escape the detection of the conventional filtering software used to detect junk electronic messages (commonly referred to as "spam"). In some cases, even when the spam filtering software detects that a message is junk and places it into a spam folder, because the message appears to be authentic, the recipient may reclassify the message and respond to it. It would be desirable to have a technique that would identify the fraudulent messages and prevent users from becoming victims of such scams.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

A technique for classifying a message is disclosed. In some embodiments, the technique uses reference points in the message to classify the message. In some embodiments, the message is determined to be a phish message if divergent reference points are detected. In some embodiments, fraud indicators are identified in the message and a statistical analysis is used to determine whether the message is fraudulent.

Figure 1:
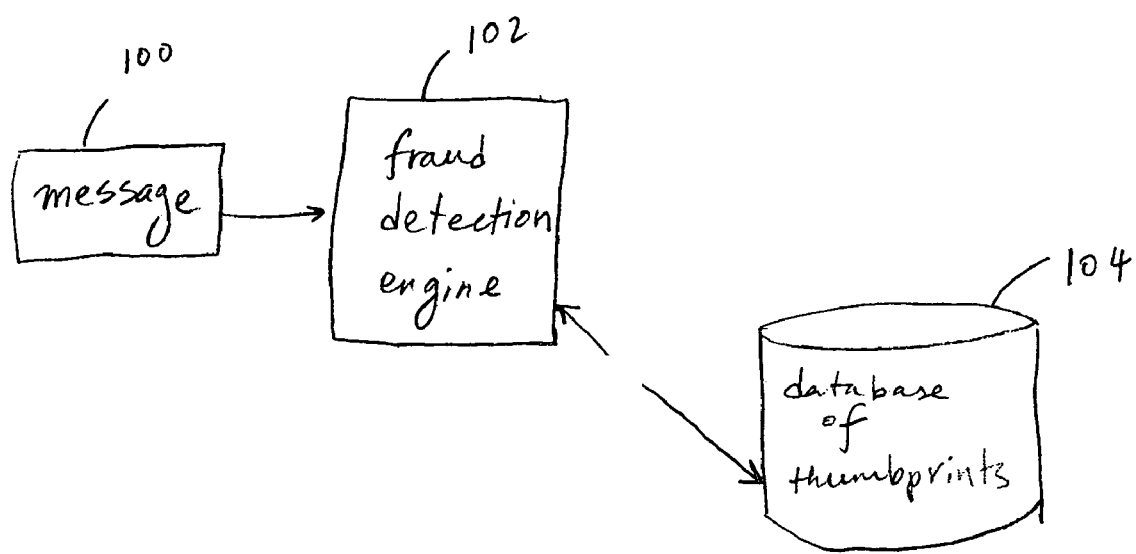
FIG. 1 is a system diagram illustrating a system used to detect fraud messages according to one embodiment.

FIG. 1 is a system diagram illustrating a system used to detect fraud messages according to one embodiment. Incoming messages such as message 100 are examined by fraud detection engine 102. The fraud detection engine may be a stand-alone software and/or hardware component, or integrated into a spam filtering system, mail system, or any other appropriate software code and/or hardware devices. It may be deployed on client devices such as personal computers as well as message gateways used to filter messages at an enterprise level. The fraud detection engine analyzes the message and determines whether it is a fraudulent message. Details of the detection process are discussed below. In some embodiments, once a fraudulent message is detected, a thumbprint or signature of the message is optionally computed. The thumbprint may be computed using techniques such as applying a hash function to the content of the message. The thumbprint may be stored in a database 104 to more efficiently identify this fraudulent message in the future. In some embodiments, the thumbprint database may be shared among users on a network.

To make the fraudulent message appear authentic, the body of this type of messages usually includes reference points to a legitimate source, such as URL links to logo images or web pages of well-known company, e-mail addresses with well-known domain name, as well as any other contact or identity information associated with well-known entities. As used herein, a reference point refers to information in the message that can be used to contact the referenced entity or establish the identity of the referenced entity; a legitimate source refers to an entity that can be verified as being reputable. In order for the fraudulent message to fulfill its intended purpose, it should provide the recipient with ways to supply the desired information to the sender. Some of the fraudulent messages include a reference point to a questionable source or entity whose reputation cannot be easily verified. The recipient is often instructed to provide his/her personal information to the questionable source by, for example, entering information into the message or by following a link to a website operated by the sender. This type of fraudulent messages, referred to as phish messages, usually include in the message body at least one reference point to a source that is legitimate and at least one reference point to a questionable source. The characteristic of having a legitimate reference point and a questionable reference point is referred to as divergence, and such reference points are referred to as divergent reference points. Divergence can be used in some embodiments to identify phish messages.

Figure 2:
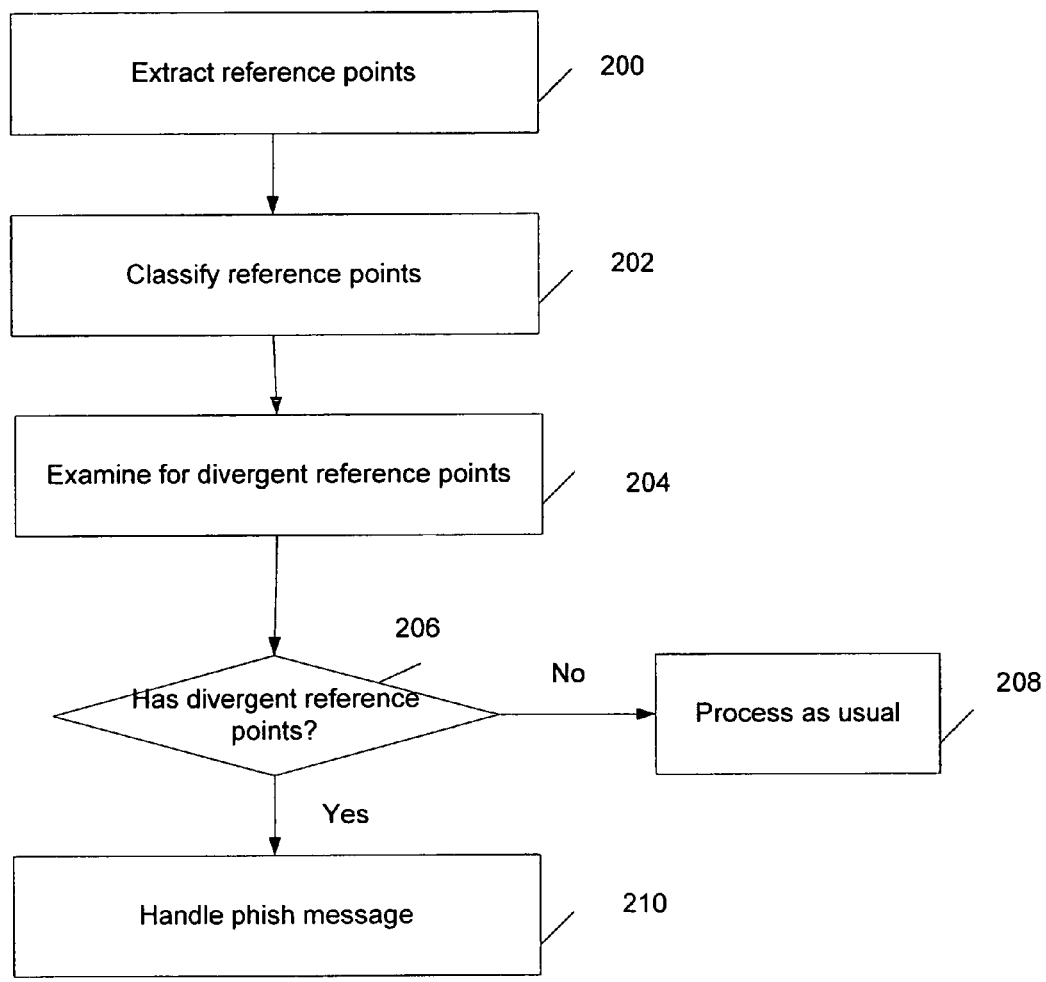
FIG. 2 is a flowchart illustrating a message classification process according to one embodiment.

FIG. 2 is a flowchart illustrating a message classification process according to one embodiment. In this example, reference points are extracted from a message (200). In some phish messages, the reference point to the questionable source is disguised to trick the reader. For example, the URL http://scgi.ebay.com@%32%31%31%2E %33%37%2E %31%38%35%2E %33%30:%37%33%30%31 appears to be a link to "scgi.ebay.com" to the casual reader, but it actually links to a web page at a server with the IP address of 211.37.185.30, on port 7301. In some embodiments, both the reference point to scgi.ebay.com and the reference point to the numbered server are extracted.

The reference points are then classified (202). In some embodiments, the reference points are looked up in a database that includes references of legitimate sources. There are various ways to establish and maintain the database. In some embodiments, users on a network can collaborate and vote on various reference points to determine whether they are legitimate, and the results of the collaborative effort are stored in the database; in some embodiments, collections of spam messages and good messages can be analyzed and the reference points in the messages can be extracted and stored to the database according to the message classification; in some embodiments, a registration process can be used to collect information from legitimate businesses and organizations; in some embodiments, existing databases of good reference points such as classified URLs, domains and phone number can be imported. In some embodiments, a reference point is classified as legitimate if the reference point or the source referenced can be found in the database; otherwise, the reference point is classified as unknown. In some embodiments, the reference point may also be looked up in a database of known offenders. A reference point found in this database may be classified as bad. Both unknown and bad reference points are classified as questionable reference points in some embodiments.

In the example shown in FIG. 2, the message is then examined for divergent reference points (204). In some embodiments, different types of reference points are counted, and if there is at least one good reference and at least one questionable reference in the message body, then the message is deemed to have divergent reference points. It is then determined whether the message has divergent reference points (206). A message that does not have divergent reference point is less likely to be a phish message and is processed as usual (208). In some embodiments, the message is delivered to the recipient. In some embodiments, the message is further processed by spam classifiers. If, however, the message is determined to have divergent reference points, it is potentially a phish message and is handled appropriately (210). The handling of the message may vary for different implementations. In some embodiments, the message may be deleted or quarantined. In some embodiments, the recipient may be alerted about the phish message. The alert can take many forms; for example, an indicator such as "[fraud]" may be added to the subject line, the recipient may be notified that a message has been quarantined or deleted, etc. In some embodiments, the recipient may be given detailed explanation of why the message is likely to be fraudulent. For example, both the legitimate source from which the message appears to be originated and the questionable source designed to misguide the recipient may be clarified for the user.

Figure 3:
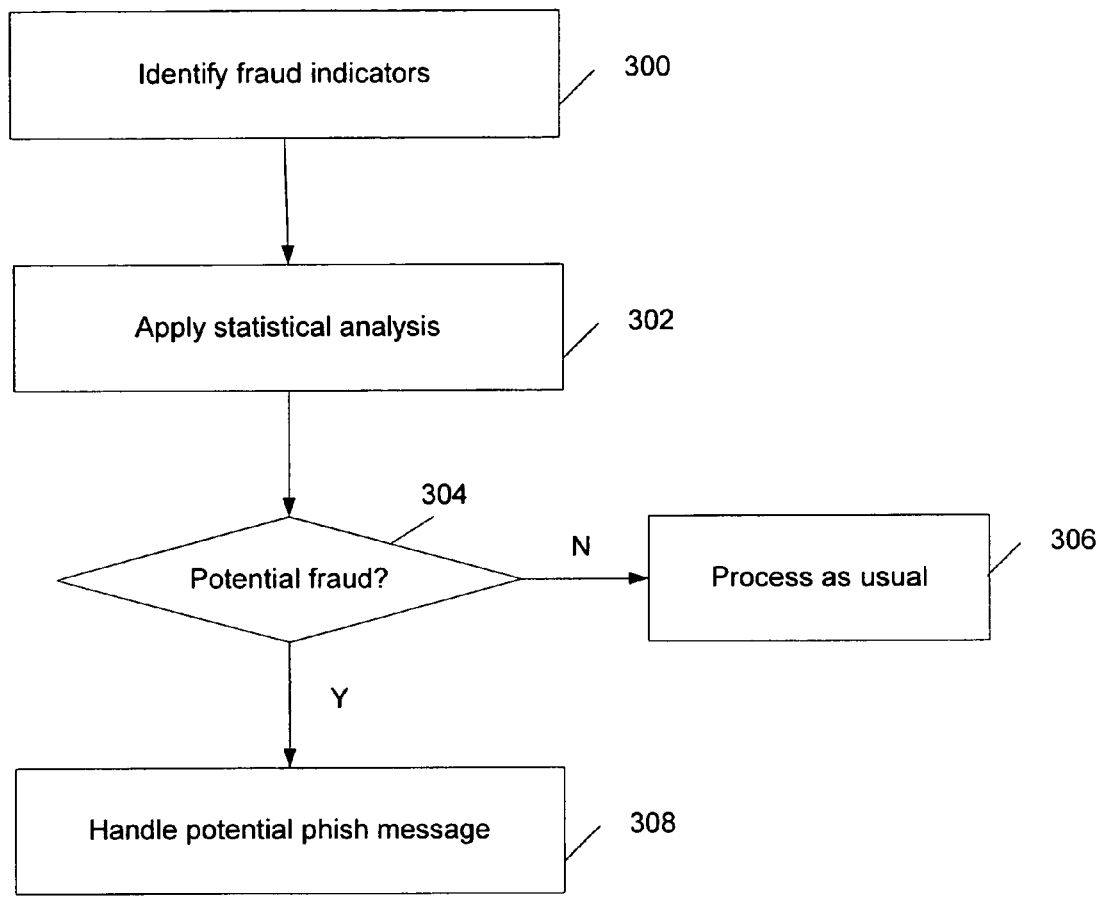
FIG. 3 is a flowchart illustrating a message classification process according to another embodiment.

In some embodiments, a statistical approach is used to classify phish messages as well as other types of fraud messages. FIG. 3 is a flowchart illustrating a message classification process according to another embodiment. In this example, fraud indicators are used to classify fraudulent messages. Fraud indicators are patterns that are characteristic to fraudulent messages. For example, having divergent reference points is one type of fraud indicator. More details of fraud indicators are discussed below. In some embodiments, the fraud indicator is identified by parsing the message and locating certain patterns (300). A statistical analysis is then applied based on the fraud indicators (302). There are various statistical techniques applicable for the purposes of identifying fraud messages. In some embodiments, the number of fraud indicators is counted and the likelihood of the message being a fraudulent message is computed based on the number of fraud indicators. Other statistical approaches for analyzing the indicators include neural networks, decision tree and classification tree techniques, logistic regression, as well as any other techniques or combination of techniques for analyzing features of the message according to a statistical model.

It is then determined whether the message is a fraudulent message (304). In some embodiments, the message is determined to be fraudulent if the number of fraudulent indicators exceeds a threshold. In some embodiments, the statistical analysis computes a score that is used to determine whether the message is fraudulent. In some embodiments, the statistical analysis assigns weights to different indicators and computes a weighted score used to determine whether the message is fraudulent.

If the statistical analysis determines that the message is not a fraudulent message, it is processed as usual (306). In some embodiments, the message is delivered to the recipient. In some embodiments, the message is further tested using other spam filtering techniques. If the message is determined to be a fraudulent message, it is handled appropriately so that the recipient is prevented from responding to the fraudulent message (308). The message may be deleted or quarantined in some embodiments; alerts and explanations may be sent to the recipient in some embodiments. In some embodiments, a probability of being fraudulent is assigned to the message and the message is processed according to the probability.

The statistical message classification process shown in FIG. 3 may be used in conjunction with the message classification process shown in FIG. 2. In some embodiments, once it is determined that the message has divergent reference points (206), a statistical technique is applied to further ascertain the nature of the message. There are several fraud indicators that may be used by the statistical analysis, including raw Internet protocol (IP) addresses, non-standard encoding of URL's or addresses, links with user names embedded, misleading links, mismatched link names, message including forms, forms with certain special requests, suspect content, etc.

Some fraudulent messages disguise the URL to the questionable source by using raw IP addresses such as http://211.37.185.30:7301. Therefore, raw IP addresses may be used as a type of fraud indicator in some embodiments. The identification of a raw IP address may be achieved by, for example, locating a string with a pattern of four numbers separated by periods.

In some embodiments, non-standard encoding is used as a type of fraud indicator. Fraudulent messages sometimes use non-standard encoding of URL to obfuscate their addresses, such as the URL http://scgi.ebay.com@%32%31%31%2E %33%37%2E %31%38%35%2E %33%30:%37%33%30%31 shown in a previous example. There are a variety of ways for determining whether non-standard encoding is used in a message, including finding % signs in URL links, using raw IP numbers in decimal, dword, octal or hexadecimal format, etc.

In some embodiments, URL links embedded with user names are used as a type of fraud indicator since fraudulent messages sometimes use this type of links. For example, http://USER@netgo.port5.com has a user name embedded in it. This type of fraud indicator may be identified by searching for an "@" symbol after "http://" or "https://".

In some embodiments, URL links embedded with misleading links are used as a type of fraud indicator since fraudulent messages sometimes include this type of URL. A misleading link disguises the questionable source by incorporating a reference to a well-known source. For example, http://www.paypal.com@netgo.port5.com/index.php includes a user name "www.paypal.com" that has the format of a domain name. Without closely inspecting the link, the recipient is likely to mistake www.paypal.com as the linked website rather than netgo.port5.com. This type of fraud indicator may be identified in some embodiments by searching for an "@" symbol followed by a domain name, where the text prior to the "@" symbol includes a substring such as ".com", ".net", "www", etc.

In some embodiments, mismatched link names are used as a type of fraud indicator. For example, a hyper text markup language (HTML) document with the URL <A href="http://www.digitalgamma.com/fraud.html">http://www.BestBuy.com/fraud_department.html </A> actually links to the domain "www.digitalgamma.com"; however, the standard techniques for rendering HTML usually displays the link to the recipient as if it is a link to "www.BestBuy.com". This type of fraud indicator may be detected in some embodiments by comparing the actual link and the displayed link.

Forms in messages are used as a type of fraud indicator in some embodiments. Although forms are not commonly used in legitimate messages, fraudulent messages sometimes include forms in order to obtain information from the recipient. Thus, in some embodiments, the message is inspected for the <FORM action= . . . > tag that is embedded in the message to determine whether the fraud indicator is present.

Form requesting special information such as personal information is another type of fraud indicator that is used in some embodiments. The indicator is present if the message is determined to include a form, and the content of the form starting from the beginning "<FORM>" tag to the end "</FORM>" tag (or the end of the message if the end "</FORM>" tag is not present) includes requests for personal information. Whether the form is requesting personal information may be determined by looking up key terms such as "Password", "Credit card", "Social security number", "Expiration date", "PIN", and any other terms pertaining to personal information.

In some embodiments, suspect content is used as a type of fraud indicator. Suspect content may be detected by searching for certain key words or phrases such as "verification of your account", "click on the link below to login", "fraud alert", "please confirm your account ownership by entering the information below", etc.

A technique for classifying a message has been disclosed. The technique is applicable to phish messages as well as other types of fraud messages. For example, the technique may also be applicable to messages used to commit brand fraud, where the recipient is shown a product of a certain brand, but directed to a website unrelated to the brand-name product to purchase a different product.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for classifying a message, comprising:
   extracting a plurality of reference points from a body of the message, each reference point being information used to contact a referenced entity;
   classifying each of the plurality of reference points based on a source associated with each reference point;
   determining whether the message is a fraudulent message appearing to be from a legitimate source based on the classified reference points; and
   processing the message based on the determination of whether the message is a fraudulent message appearing to be from a legitimate source.

2. The method of claim 1, wherein classifying the plurality of reference points includes looking up the plurality of reference points in a database.

3. The method of claim 1, wherein detecting that the message is a fraudulent message appearing to be from a legitimate source includes determining that the message includes divergent reference points.

4. The method of claim 1, wherein detecting that the message is a fraudulent message appearing to be from a legitimate source includes determining that the plurality of reference points includes a first reference point to a first source and a second reference point to a second source.

5. The method of claim 1, wherein detecting that the message is a fraudulent message appearing to be from a legitimate source includes determining that the plurality of reference points includes a first reference point to a legitimate source and a second reference point to a questionable search.

6. The method of claim 1, wherein detecting that the message is a fraudulent message appearing to be from a legitimate source includes determining that the plurality of reference points includes a first reference point to a first source and a second reference point to a second source, and the second reference point is intended to appear as a reference to the first source.

7. The method of claim 1, further comprising computing a thumbprint of the message and storing the thumbprint to a database.

8. The method of claim 1, further comprising computing a thumbprint of the message and storing the thumbprint to a database; wherein the database is shared.

9. The method of claim 1, further comprising identifying a plurality of fraud indicators and applying a statistical analysis on the plurality of fraud indicators.

10. The method of claim 1, further comprising quarantining the message.

11. The method of claim 1, further comprising deleting the message.

12. The method of claim 1, further comprising providing an alert to a recipient of the message.

13. The method of claim 1, further comprising providing an alert to a recipient indicating that the message is a fraudulent message appearing to be from a legitimate source.

14. The method of claim 1, further comprising providing an explanation of the fraudulent message appearing to be from a legitimate source to a recipient.

15. A computer readable storage medium having embodied thereon a program, the program being executable by a processor to perform a method for classifying a message, the method comprising:

extracting a plurality of reference points from a body of the message;

classifying the plurality of reference points;

determining whether the message is a fraudulent message appearing to be from a legitimate source based on the classified reference points; and processing the message based on the determination of whether the message is a fraudulent message appearing to be from a legitimate source.

* * * * *